Jan. 14, 1964 H. M. ROBINSON 3,118,106
STATIC INVERTER
Filed May 22, 1959 3 Sheets-Sheet 1
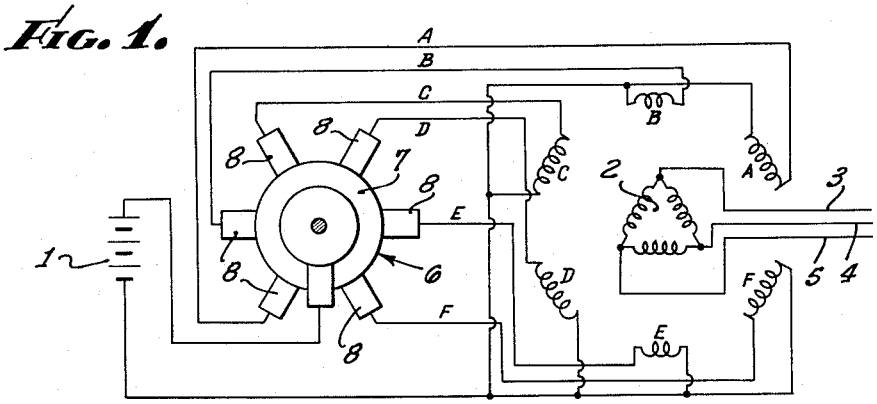
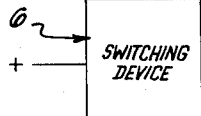
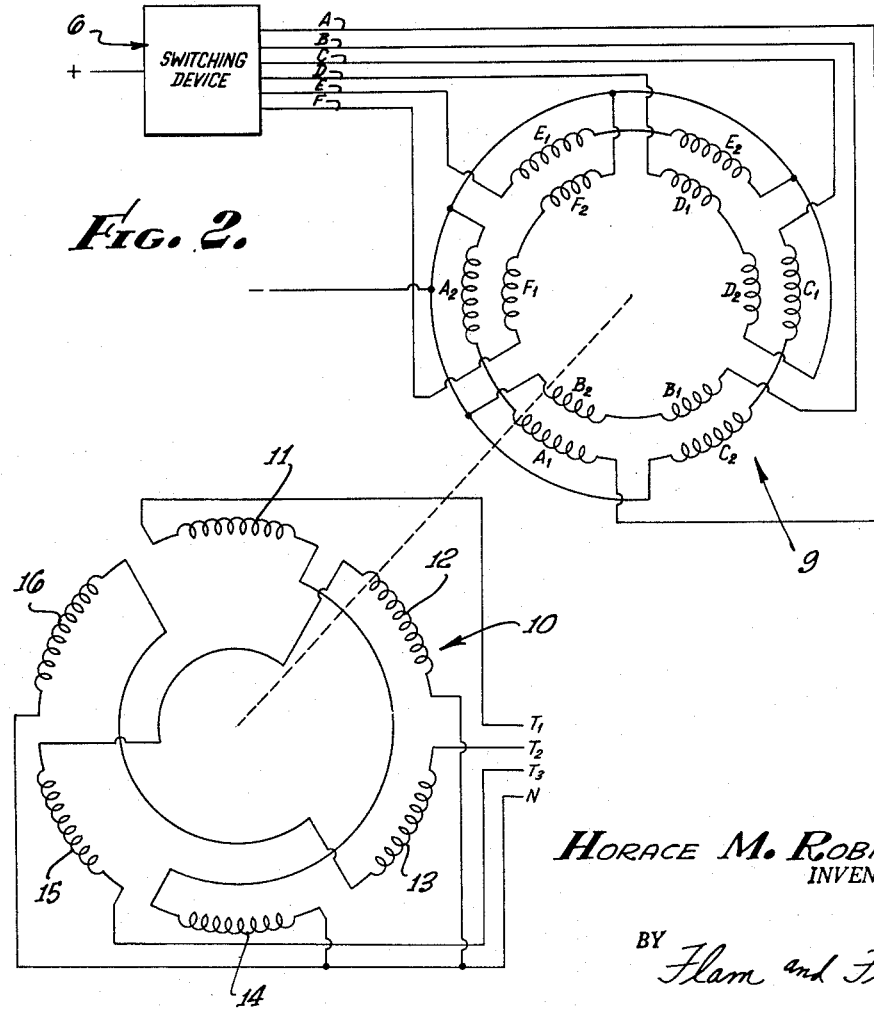
HORACE M. ROBINSON
INVENTOR.
BY Flam and Flam
ATTORNEYS.

Jan. 14, 1964 H. M. ROBINSON 3,118,106
STATIC INVERTER
Filed May 22, 1959 3 Sheets-Sheet 2

HORACE M. ROBINSON
INVENTOR.

BY Flam and Flam
ATTORNEYS

United States Patent Office 3,118,106
Patented Jan. 14, 1964

3,118,106
STATIC INVERTER
Horace M. Robinson, 3927 Collis Ave., Los Angeles 32, Calif.
Filed May 22, 1959, Ser. No. 815,123
29 Claims. (Cl. 321—49)

This invention relates to electrical converter systems, and more particularly to a system for converting direct current power into alternating current power by switching means, or vice versa. Such systems in general have been proposed.

Three types of switching devices are currently in use. One is the mechanical "all-on," "all-off" type, together with its electrical counterparts; controlled rectifiers; or transistors operated in a switching mode. The second is the 360° rotating potentiometer and its electrical counterpart, the transistor. The third is the triode electronic tube.

The second type has the distinct disadvantage that, while it provides a shaped wave more or less approximating the desired sine wave, it does so only by voltage-consuming resistors, or the equivalent, to reduce the voltage from the peak value to some lower value at all times except twice during each cycle. It is thus very wasteful in energy (of the useful work, perhaps twenty-five percent must additionally be lost). Because of the large amounts of heat that must be extracted from this type of device, it is limited only to the small power applications.

Triode vacuum tubes are also used in these applications, and while they can provide the desired wave shape and do so without the equivalent losses of the dropping resistors, they are otherwise quite inefficient because of resistance losses and are limited also to small power applications.

In order to minimize the losses in utilizing equipment and for other reasons, it is essential that the alternating current output have approximately a sine wave configuration. Yet in contrast to this, a simple switching arrangement for alternating the direction of current flow necessarily results in wave forms approaching a flat top type, in which numerous high harmonics are present. All these contribute in large measure to the losses encountered in many forms of alternating current loads, such as, for example, as dynamoelectro machinery, transformers or solenoids.

While the simple switching device produces virtually a square wave, it is possible, by regulating the relation of on-time to off-time, to vary the harmonic content when analyzed by methods used to design salient pole synchronous generators. Thus, such timing reduces the harmonics of the rotating field.

Proposals have been made in the past to reduce the amplitudes of certain harmonic components to a tolerable value. For example, a transformer with specific types of windings may be interposed between the D.C. and A.C. sides of the apparatus.

Such known systems are quite complex, correspondingly expensive and not completely effective.

It is one of the objects of this invention to make it possible to eliminate or reduce the harmonics to a low value in a substantially less expensive manner.

For this purpose, a transformer structure is provided in which the primary and secondary windings are arranged in a manner analogous to the stator and rotor windings of an induction motor; but, of course, both sets of windings are non-rotary. The primary winding is composed of a number of sections equiangularly disposed around the "stator" core and energized cyclically from the direct current source. These windings may be distributed in slots. The "secondary" windings are similarly distributed on the "rotor" core, and may have terminals corresponding to a three-phase delta or Y connection; and these terminals correspond to the output of the apparatus.

A three-phase system has been chosen here for the purpose of illustration although any polyphase system may be used. Three-phase is, however, by far the predominant system now in use throughout the world.

In such a transformer structure, the harmonics are suppressed or the transformer is tuned to the fundamental by means commonly employed by good generator and motor design practices. Such methods are illustrated in all texts on rotating dynamoelectric machines and specific reference is given to Knowlton's Standard Handbook for Electrical Engineers, Ninth Edition, published by McGraw-Hill Book Company, Inc., in section 7, paragraphs 1 to 16, relating to generators of the salient pole type. Methods of computing the effects are given for phase belt factor, pitch factor, distribution factor and skew factor. Furthermore, by connecting the secondary windings in phase groups undesired harmonics may be suppressed or internally circulated. For example, using 60° phase belts in the secondary will eliminate all even and all triple harmonics. Simultaneously pitching this winding ⅘ pitch will eliminate all 5th and multiples of 5th harmonics. Pitching the primary 6/7 pitch eliminates the 7th, and by using eleven phases in lieu of the usual twelve, the 11th harmonic is also eliminated. By skewing one member relative to the other the amount corresponding to one harmonic pole (for the 13th, this is 13.85°), the balance of the harmonic is either eliminated or reduced to very small values. All the above is accomplished in a relatively loss-free manner.

In previous devices, attempting to minimize the harmonics of the simple switching device, the transformers were often connected in delta to circulate third harmonic currents. These circulating currents all represent losses in the device. It is an object of this invention to accomplish as much harmonic reduction as possible without the use of circulating currents by the methods previously described, and to utilize the mesh-connected winding and the attendant circulating harmonic currents only to suppress some troublesome higher harmonic.

Because of the discrete number of switching elements involved, the sweep of the magnetic flux about the axis fails to be perfectly smooth but rather tends to move in discrete jerks. This may, in turn, be broken down to consist of a fundamental rotating field and harmonic rotating fields, and while a prefectly designed primary and secondary winding system will not permit these harmonics to appear in the secondary, they produce harmonic losses in the iron structure of the device itself and simultaneously offer an inductive back E.M.F. to the switching device, causing it to burn contacts or puncture. This inductance is, in part, reduced compared with common transformer systems by the close coupling of the primary phases to each other. Since some residual inductance remains, it is another object of this invention to eliminate or further reduce this inductance by the aid of short-circuited tertiary windings of special design.

It is further found that the proper design of this tertiary winding will aid in commutation for loads of power factor other than unity, and it is thus a further object of this invention to utilize a tertiary winding for automatic phase advancing.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic representation of a system incorporating the invention;

FIG. 2 is a wiring diagram of a modified form of the invention;

Figure 3:
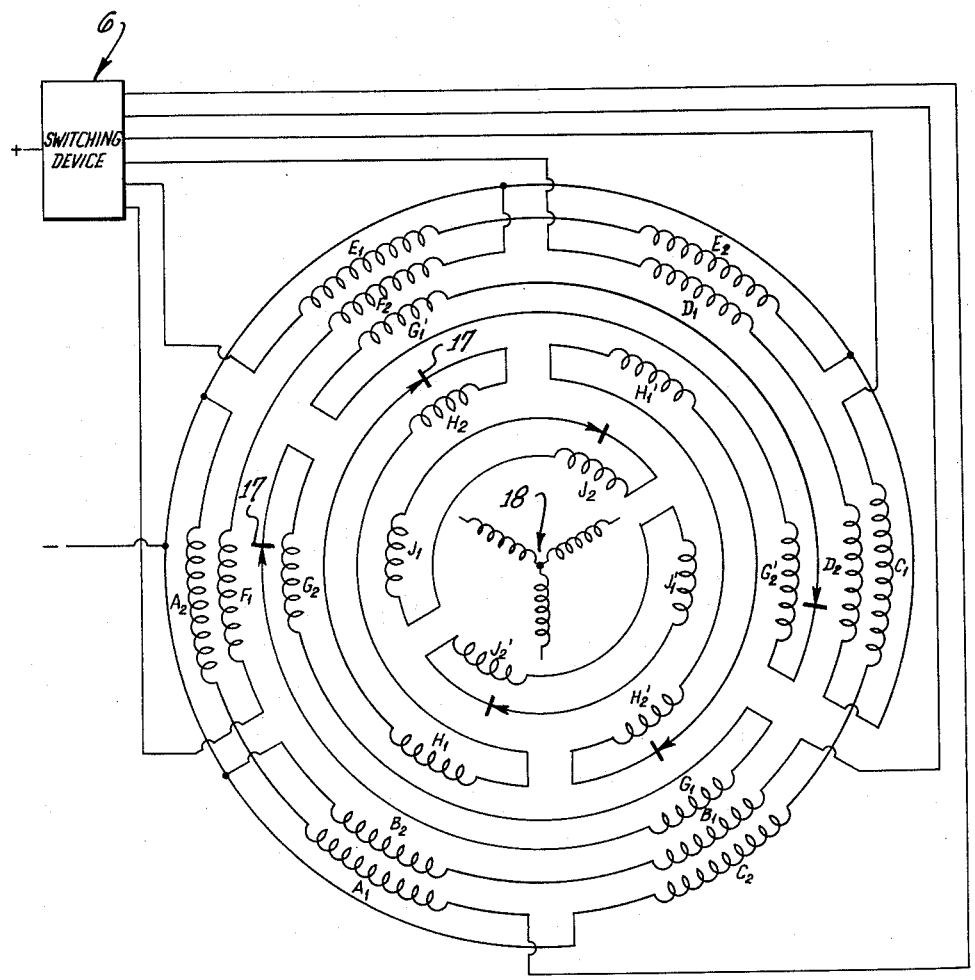
FIG. 3 is a diagrammatic representation of a further modification.

In FIG. 1 there is illustrated a source of direct current 1 which may be in the form of batteries or the like. There is also indicated a three-phase delta winding 2, having leads 3, 4 and 5 adapted to be connected to an alternating current load.

The three-phase winding 2 is wound on a stationary or dummy rotor secondary. In order to induce alternating current in the winding 2, a primary winding from source 1 is in inductive relation to winding 2. In this instance, coil sections A, B, C, D, E and F are equiangularly spaced around the common axis of the two windings and distributed in slots, as in an ordinary stator structure. These windings are successively energized so as to produce the rotating magnetomotive force and field by a switching device 6 for thus successively energizing the windings. It is shown in diagrammatic form only. This switching device 6 may include a rotary commutating element 7 rotated at a speed to correspond to the desired frequency of the output alternating current. The switching elements 8 diagrammatically might otherwise represent diodes or transistors or thyratron tubes or the like.

The rotary element 7 may be rotated in either direction. Assuming that it is rotated in a clockwise direction, the winding sections A, B, C, D, E and F are successively energized in that order.

In FIG. 2 a primary winding 9 is indicated mounted coaxially with a secondary winding 10. The secondary winding 10 is shown with six sections 11 to 16. A Y connection is formed, each leg of the Y consisting of two diametrically opposite sections. The sections have turns distributed over an angle corresponding to the number of phases. As an example, for one design there may be forty-two slots in the secondary core with forty-two coils without skew. The pitch of the coils may be eighteen slots. Thus, the pitch is somewhat less than a half circumference. There might be seven coils in each of the sections 11 to 16; thus, the total turns in all of the slots correspond to the number of slots. The air gap and the distribution of secondary windings relatively decouples the secondary from the primary and facilitates the production of signals at the fundamental frequency.

On the primary 9 there are six sections A to F, inclusive. Each section has two portions; thus, section A includes the parts $A_1$ and $A_2$; section B has the parts $B_1$ and $B_2$; and the same designation is made for the other sections C, D, E and F. The sections B, D and F overlap the sections A, C and E in a symmetrical manner. In other words, the portions $B_2$ and $A_1$ are superimposed, as well as the paired portions $A_2 F_1$, $E_1 F_2$, $E_2 D_1$, $C_1 D_2$, and $B_1 C_2$. Thus, each of the pairs lies around the stator or primary core.

The switching device 6, as in FIG. 1, energizes the sections A to F, inclusive, in that order.

FIGS. 1 and 2 illustrate the equivalent state of the art when individual transformers are used and connected in various manners. When wound on one common core, however, a considerable reduction in back E.M.F. imposed on the switching device is produced without extra losses by the mutual inductance of the phases being lower than with separate transformers. Furthermore, by careful adjustment of the timing and period of the energization of the windings by aid of device 6, the harmonic content is reduced.

In the form shown in FIGS. 3 and 4, additional short-circuited windings $G_1$—$G_2$, $G_1'$—$G_2'$, $H_1$—$H_2$, $H_1'$—$H_2'$, $J_1$—$J_2$, and $J_1'$—$J_2'$ are provided for assisting in the commutation of the flux, as will be described hereinafter. The sections B through F are energized as before.

Figure 4:
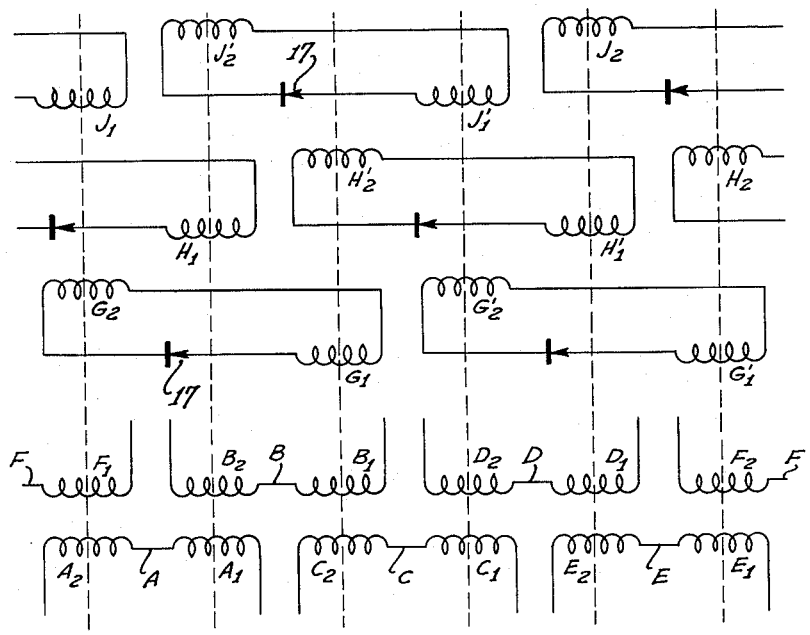
FIG. 4 is a development of the diagram of FIG. 3.

The windings G, G' are diametrically opposite and have sections in inductive relation to certain sections of the main windings, as indicated by the vertical phantom lines in FIG. 4. Similar considerations apply to windings H, H' and J, J'. Sections $G_1$ and $G_1'$ are diametrically opposite; and this is true of the correspondingly paired coils of windings H, H' and J, J'.

Let us assume that section A has been energized and that a magnetic field exists coaxially with the coils of phase A. Now the switching device 6 deenergizes section A and energizes section B. The field linking sections $A_1$ and $B_2$ need not change, and current could be transferred from section $A_1$ to $B_2$ in a smooth, non-inductive manner. However, the flux linking section $A_2$ must collapse before the current in phase A can stop and, similarly, the field in section $B_1$ must build up before current can flow. Obviously this inductance will burn contacts of the switching device or puncture transistors if they are used. Here, however, a group of windings $G_1$, $G_2$ together with rectifier 17 is in essence a closed circuit so that the opening of circuit A circulates instantly an equivalent current in sections $G_1$, $G_2$. These currents are so disposed that they correspond to the current which has been removed from section $A_1$ and are equal and opposite to the current in section $B_2$. These induced currents in time die down and the magnetic field is transferred from linking section $A_1$ to linking section $B_2$. This, of course, creates the rotating field required to induce voltage into the secondary winding 18 and, because of the gradual decay of each phase of the tertiary, the field is caused to rotate more evenly. This transfer does not, however, occur loss-free but is equal to the hysteresis loss of the iron, plus whatever extra M.M.F. is supplied for air gaps. This loss need not all occur within the transformer but can be dissipated in resistors connected in series with the rectifiers. While this may seem a sizable loss, it actually represents a net gain over the choppy field motion otherwise produced (and, even worse, the square wave in separate transformers) that may produce eddy currents having ten times the loss of the fundamental hysteresis loop.

The presence of the rectifiers 17 prevents the transfer of the magnetic field in any direction except in the direction of rotation of the switching mode.

As the current transfers from section A to section B in the primary winding, the secondary winding is unable to transfer simultaneously due to the reflective inductance of the load connected to the secondary winding 18. The tertiary windings G, H and J support equivalent current during this time, absorbing the collapse of the inductive field of the load by current transfer action without excessive back electromotive force across the switching element.

The inventor claims:

1. In an inverter: transformer core means having series of slots for accommodating windings;

a direct current source;

a distributed primary winding in the slots, and comprising a number of sections disposed in an array relative to one another and capable of separate excitation;

means operatively connected between the sections of the primary winding and the direct current source for normally maintaining the sections of the primary winding in a state of non-conductivity and for separately and individually exciting each of said winding sections from the direct current source on a cyclical basis for a particular portion of the time in each cycle whereby a traveling flux field is created in the array;

a secondary winding in the slots and disposed in an array with respect to the primary winding to facilitate the production of a fundamental frequency related to said cyclically exciting means; and means providing external access for the secondary winding for connection to an alternating current lead.

2. The combination as set forth in claim 1 in which said primary winding sections are disposed in spaced overlapping relationship and so that the field progresses in space by energizing successively one section and then the next overlapping section.

3. The combination as set forth in claim 2 in which the secondary windings have a pitch substantially less than the angle corresponding to the number of poles.

4. The combination as set forth in claim 3 in which the coils of the primary and secondary windings are skewed relative to each other.

5. The combination as set forth in claim 2 with the addition of a tertiary winding in inductive relationship to the primary winding, sections of the tertiary winding mutually linking the unlinked portions of adjacent sections of the primary winding, each tertiary winding being short circuited.

6. The combination as set forth in claim 5 with the addition of a rectifier in each tertiary section.

7. In an inverter for receiving a voltage from a direct current source: a pair of circular transformer core means separated by an air gap, and each having a series of slots; a primary winding distributively accommodated substantially exclusively in the slots of one of the core members, and comprising a number of sections capable of separate excitation; means for normally maintaining said winding sections in a state of non-conductivity and for cyclically exciting said winding sections to a state of conductivity from the direct current source whereby a magnetomotive force rich in harmonics is rotated at said air gap; and a secondary winding distributively accommodated substantially exclusively in the slots of the other of the core members; said windings being distributed to facilitate the production of a fundamental frequency related to said cyclically exciting means; and means providing external access for the secondary winding for connection to an alternating current load.

8. The combination as set forth in claim 7 in which the primary and secondary windings are relatively skewed to assist the production of the fundamental frequency by the transformer.

9. The combination as set forth in claim 7 in which a pitch differential of the windings facilitates the production of the fundamental frequency by the transformer.

10. The combination as set forth in claim 7 in which at least one of the windings has a belt differential factor less than unity to facilitate the production of the fundamental frequency by the transformer.

11. The combination as set forth in claim 7 in which said secondary includes phase sections for connection in star or mesh.

12. The combination as set forth in claim 7 in which said primary winding sections overlap to minimize the extent that the field of each section is required to collapse.

13. The combination as set forth in claim 7 in which said primary winding sections overlap to minimize the extent that the field of each section is required to collapse, together with a short circuited tertiary winding for each set of successive sections to transfer field strength at each position of the succeeding section, there being a unidirectionally conductive device in the tertiary winding to ensure unidirectional flow of field strength.

14. The combination as set forth in claim 7 in which said cyclically exciting means controls the conduction period and off period for the successive primary winding sections.

15. In combination, a source of current, a first plurality of windings disposed in a spaced relationship and connected to the source of current and in a parallel relationship to one another, switching means connected to the windings in the first plurality and constructed to obtain the flow of current from the source to the successive windings in the plurality on a sequential basis and to provide for an open circuit between the source and the windings during the times that current is not flowing from the source to the windings and a second plurality of windings disposed in a particular magnetically coupled relationship to the windings in the first plurality and connected to one another in a particular relationship to produce an alternating signal.

16. In combination, a source of current, a first plurality of windings disposed in a spaced relationship and connected to receive current from the source, switching means connected to the windings in the first plurality to obtain an individual and sequential activation of the windings in the plurality in a particular timed relationship and in a particular pattern for controlling the waveshape of the magnetic flux generated at successive instants of time and at the different positions along the windings in the plurality and to prevent the activation of the windings during the times that the windings are not being activated, and a second plurality of windings connected in a particular relationship and disposed relative to the windings in the first plurality to generate an output signal having alternating characteristics dependent upon the flux generated by the windings in the first plurality.

17. In combination, a source of current, a first plurality of windings disposed in a spaced relationship, a second plurality of windings disposed in a spaced relationship and disposed in a particular magnetically coupled relationship to the windings in the first plurality, and control means connected in electrical circuitry with the windings in the first plurality and with the current source normally to provide an open circuit between the current source and the windings in the first plurality for preventing the introduction of current from the source to the windings in the first plurality and to obtain the introduction of the current from the source to the different windings in the first plurality in a particular timed relationship for the induction of an alternating signal in the windings in the second plurality, the windings in the second plurality being connected to one another to obtain the production of alternating signals by such windings in accordance with the operation of the control means.

18. In combination, a source of direct current, a first plurality of windings disposed in spaced relationship to one another to define a circle, a second plurality of windings disposed in spaced and concentric relationship with the first plurality of windings and in particular magnetic proximity to the windings in the first plurality for the induction of signals in the windings in the second plurality in accordance with the pattern of magnetic flux produced by the windings in the first plurality, and switching means connected to the source of direct current and to the windings in the first plurality for providing an open circuit between the current source and the windings in the first plurality and for sequentially closing the circuit between the voltage source and successive windings in the first plurality about the circle defined by the windings, the windings in the second plurality being connected to one another to produce an alternating signal in accordance with the sequential operation of the switching means.

19. In combination, a source of direct current, a first plurality of windings disposed in spaced relationship to one another to define a circle and connected in groups, switching means connected to the source of direct current and to the windings in the first plurality for providing an open circuit between the current source and the windings in the first plurality and for sequentially closing the circuit from the current source to the successive groups of windings in the first plurality along the periphery of the circle defined by the windings and in a progressive relationship with respect to time for the windings in each group, and a second plurality of windings disposed in spaced and concentric relationship with the first plurality of windings and in particular magnetic proximity to the windings in the first plurality and connected to one another in a particular relationship for the induction of signals in the windings in the second plurality in accordance with the pattern of magnetic flux produced by the groups of windings in the first plurality and for the production of an alternating signal by the windings in the second plurality.

20. In combination, a source of current, a first plurality of windings disposed in a spaced relationship and connected in a first phase relationship constituting a first particular number of phases, a second plurality of windings disposed in a spaced relationship and disposed in magnetically coupled relationship to the windings in the first plurality and connected in a second phase relationship constituting a second particular number of phases where the second particular number of phases is different from the first particular number of phases, control means connected in electrical circuitry with the windings in the first plurality and with the current source normally to provide an open circuit between the current source and the windings in the first plurality for preventing the introduction of current from the source to the windings in the first plurality and to obtain the introduction of current from the source to the different windings in the first plurality in a particular timed relationship for the induction in the windings in the second plurality of an alternating voltage having a fundamental frequency dependent upon the timing in the operation of the control means and having harmonics different from integral multiples of the first particular number of phases and the second particular number of phases.

21. In combination, a source of current, a first plurality of windings disposed in a spaced relationship and connected to receive current from the source, switching means connected to the windings in the first plurality normally to provide an open circuit between the current source and the windings in the first plurality for preventing the activation of the windings and to obtain an individual activation of the windings in the plurality in a particular timed relationship for a flow of current from the source during such activation, and a second plurality of windings different from the first plurality and disposed in a spaced relationship to one another and in magnetic proximity to the first plurality of windings to obtain the induction of an alternating signal having a particular fundamental frequency dependent upon the timed relationship in the operation of the switching means and to prevent the production of harmonics constituting integral multiples of the number of windings in the first plurality and the number of windings in the second plurality.

22. In combination, a source of direct current, a first plurality of windings disposed in spaced relationship and connected to the source of voltage, a second plurality of windings different from the first plurality of windings and disposed in spaced relationship to one another and in magnetically coupled relationship to the windings in the first plurality, and switching means operatively coupled to the windings in the first plurality normally to provide an open circuit between the source and the windings in the first plurality for preventing the windings from being energized and to energize the windings in the first plurality in sequence for the induction of signals in the windings in the second plurality.

23. In combination, a source of current, a first plurality of windings disposed in a spaced relationship, a second plurality of windings disposed in a spaced relationship and in magnetic proximity to the first plurality of windings to obtain the induction of signals in the windings in the second plurality in accordance with changes in the current flowing through the windings in the first plurality, and control means connected to the windings in the first plurality and operative normally to provide an open circuit between the source of current and the windings in the first plurality for preventing the flow of current between the source and the windings and to provide for the passage of current in sequence from the source to each of the windings in the first plurality for the flow of current through each such winding and to provide for the passage of current to each of such windings on a timed basis.

24. In combination, a source of current, a first plurality of windings disposed in a displaced and overlapping and concentric relationship and connected to receive current from the source for the production of flux by the windings in accordance with the flow of current through the windings, control means connected to the windings in the first plurality normally to provide an open circuit between the source and the windings in the first plurality for preventing the introduction of current from the source to the windings and to obtain the introduction of current sequentially from the source to the different windings in the first plurality in a particular timed relationship for the production of flux by each winding upon a flow of current through the winding and for the advancement of the flux from each of the windings to the overlapping winding, and a second plurality of windings disposed in a displaced relationship to one another and in magnetically coupled relationship to the windings in the first plurality to obtain the induction of an alternating voltage in the windings in the second plurality in accordance with the production of flux by the successive windings in the first plurality.

25. The combination set forth in claim 24 in which each of the windings in the first plurality is formed from at least a pair of sections and in which one of the sections in each winding overlaps one of the sections in the next winding and in which each of the windings in the second plurality is formed from at least a pair of sections and in which the sections in the different winding in the second plurality are disposed in interleaved concentric relationship and in which the number of windings in the first plurality is different from the number of windings in the second plurality to minimize the production of harmonic signals by the windings in the second plurality.

26. In combination, a source of current, a first plurality of windings disposed in spaced relationship and connected to receive current from the source, each of the windings including at least a pair of sections disposed in a particular partially displaced relationship to the winding sections in adjacent ones of the windings in the first plurality and connected to produce flux upon an energizing of the windings, means connected to the windings in the first plurality and to the source normally to produce an open circuit between the windings in the first plurality and the source and to produce a sequential energizing of the windings in the first plurality on a cyclic basis and during a particular portion of each cycle in accordance with the spacing of the windings and to obtain the production by the windings of flux upon the energizing of the windings and to produce the particular partial displacement of the flux upon the energizing of each of the successive windings in the first plurality, and a second plurality of windings disposed in a loosely magnetically coupled relationship to the windings in the first plurality and in displaced relationship to one another to produce an alternating signal in accordance with the sequential production of flux in the successive ones of the first windings in the plurality.

27. The combination set forth in claim 26 in which each of the second plurality of windings includes at least a pair of winding sections disposed in displaced relationship to each other.

28. In combination, a source of current, a first plurality of windings disposed in spaced relationship to one another, control means connected to the windings in the first plurality and to the current source normally to provide an open circuit between the windings in the first plurality and the source for preventing the passage of current to the windings from the source and to obtain the passage of current to the windings in sequence on a cyclic basis and for only a particular portion of each cycle for the production of flux at progressive positions in the direction of the successively energized windings in the first plurality, a second plurality of windings disposed in magnetically loosely coupled relationship to the windings in the first plurality to obtain the production of an alternating voltage by the windings in the second plurality upon the cyclic passage of current to the windings in the first plurality, and a third plurality of windings in magnetically coupled relationship to the windings in the first and second pluralities and connected in electrical circuitry to produce flux for facilitating the progressive displacement of the flux along the windings.

29. The combination set forth in claim 28 in which the number of windings in the first plurality is different from the number of windings in the second plurality and in which the windings in the third plurality are connected in electrical circuits of low impedance to facilitate the production of flux by such windings and in which the windings in the third plurality are disposed in a leading relationship to the windings in the first plurality.

References Cited in the file of this patent

UNITED STATES PATENTS

| | | |
|---|---|---|
| 2,165,309 | Southgate | July 11, 1939 |
| 2,166,155 | Hutchinson | July 18, 1939 |
| 2,544,332 | Lee | Mar. 6, 1951 |
| 2,668,941 | Granat | Feb. 9, 1954 |
| 2,763,829 | Cook | Sept. 18, 1956 |
| 2,894,194 | Flood | July 7, 1959 |